(12) United States Patent
Cras et al.

(10) Patent No.: US 7,181,440 B2
(45) Date of Patent: Feb. 20, 2007

(54) MAPPING OF AN RDBMS SCHEMA ONTO A MULTIDIMENSIONAL DATA MODEL

(75) Inventors: Jean-Yves Cras, Paris (FR); Henri Biestro, Saint Cloud (FR); Ricardo Polo-Malouvier, Levallois-Perret (FR)

(73) Assignee: Business Objects, S.A., Levallois-Perret (FR)

( * ) Notice: Subject to any disclaimer, the term of this patent is extended or adjusted under 35 U.S.C. 154(b) by 0 days.

(21) Appl. No.: 10/899,862

(22) Filed: Jul. 26, 2004

(65) Prior Publication Data
US 2005/0015360 A1  Jan. 20, 2005

Related U.S. Application Data

(63) Continuation of application No. 09/826,425, filed on Apr. 3, 2001, now Pat. No. 6,768,986.

(60) Provisional application No. 60/194,232, filed on Apr. 3, 2000.

(51) Int. Cl.
*G06F 17/30* (2006.01)
(52) U.S. Cl. .............. 707/2; 707/10; 707/102; 707/103 R; 709/224; 715/501.1
(58) Field of Classification Search ............ 707/2, 707/3, 10, 100, 103 R, 200, 101, 102; 715/501.1; 709/201, 203, 224, 232; 702/62
See application file for complete search history.

(56) References Cited

U.S. PATENT DOCUMENTS 5,511,186 A * 4/1996 Carhart et al. ............. 707/2

(Continued)

OTHER PUBLICATIONS

Li, Zhaohui Kevin et al., "A Multimedia Information System for Document Authoring, Indexing and Presentation", 1997 IEEE, pp. 302-307.*

*Primary Examiner*—Shahid Alam
(74) *Attorney, Agent, or Firm*—Cooley Godward Kronish LLP

(57) ABSTRACT

A Relational Database Management System (RDBMS) having any arbitrary structure is translated into a multi-dimensional data model suitable for performing OLAP operations upon. If a relational table defining the relational model includes any tables with cardinality of 1,1 or 0,1, the tables are merged into a single table. If the relational table is not normalized, then normalization is performed and a relationship between the original table and the normalized table is created. If the relational table is normalized, but not by dependence between columns, such as in the dimension table in a snowflake schema, the normalization process is performed using the foreign key in order to generate the normalized table. Once the normalized table is generated, OLAP measures are derived from the normalized relational table by an automated method. In addition, OLAP dimensions are derived from the normalized relational table and the results of the OLAP measures derivation by an automated method according to the present invention. According to an aspect, it is possible to associate a member of a dimension to another member of the same or another dimension. According to another aspect, it is possible to create a new dimension of analysis, the members of which are all the different values that a scalar expression can take on. According to yet another aspect, it is possible to access the various instances of a Reporting Object as members in an OLAP dimension. According to the yet another aspect, it is possible to apply opaque filters or a combination of them to the data that underlies analysis.

5 Claims, 11 Drawing Sheets

U.S. PATENT DOCUMENTS

| | | | |
|---|---|---|---|
| 5,555,403 A * | 9/1996 | Cambot et al. | 707/4 |
| 5,717,924 A * | 2/1998 | Kawai | 707/102 |
| 5,778,375 A * | 7/1998 | Hecht | 707/101 |
| 5,889,951 A * | 3/1999 | Lombardi | 709/219 |
| 5,918,232 A * | 6/1999 | Pouschine et al. | 707/103 R |
| 5,965,858 A * | 10/1999 | Suzuki et al. | 235/375 |
| 6,182,060 B1 * | 1/2001 | Hedgcock et al. | 707/1 |
| 6,260,050 B1 * | 7/2001 | Yost et al. | 715/501.1 |
| 6,385,604 B1 * | 5/2002 | Bakalash et al. | 707/3 |
| 6,408,292 B1 * | 6/2002 | Bakalash et al. | 707/2 |
| 6,434,544 B1 * | 8/2002 | Bakalash et al. | 707/2 |

* cited by examiner

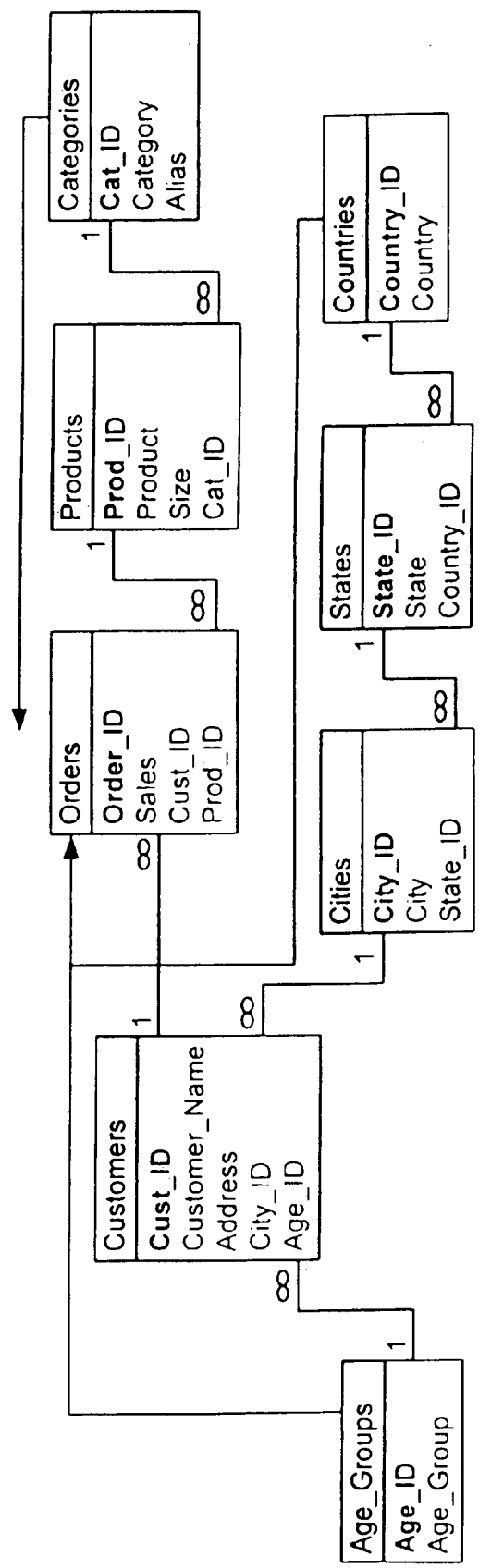
FIG. 6
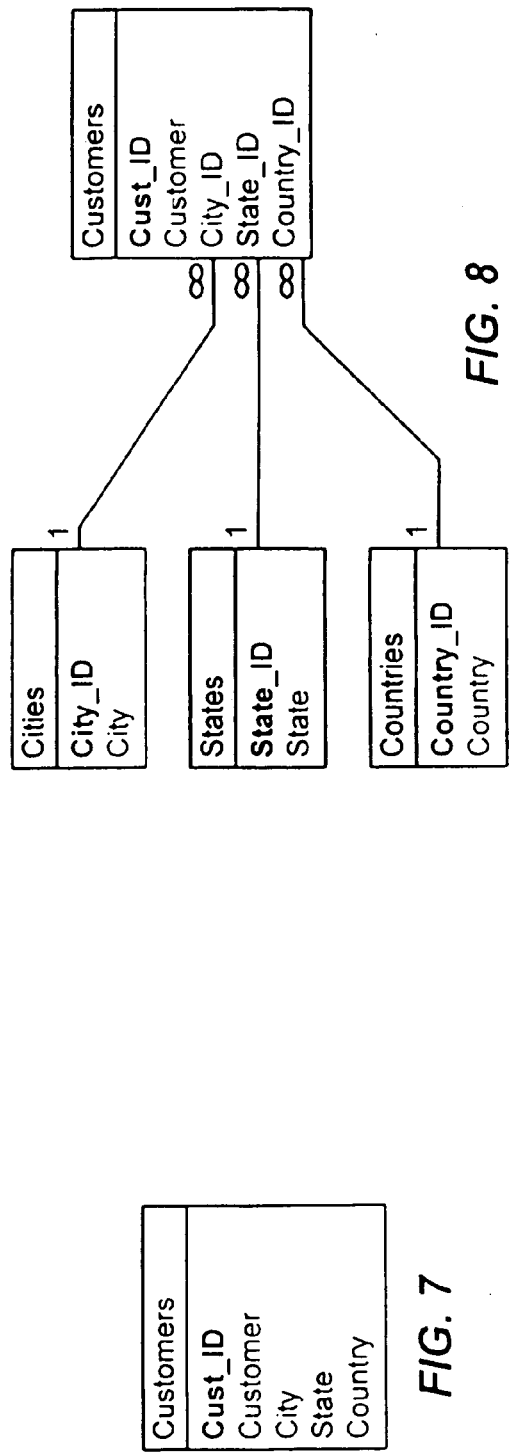
FIG. 8
FIG. 7

MAPPING OF AN RDBMS SCHEMA ONTO A MULTIDIMENSIONAL DATA MODEL

CROSS-REFERENCES TO RELATED APPLICATIONS

The present application is a continuation of U.S. patent application Ser. No. 09/826,425, filed Apr. 3, 2001, now U.S. Pat. No. 6,768,986, entitled "MAPPING OF AN RDBMS SCHEMA ONTO A MULTIDIMENSIONAL DATA MODEL" which, in turn, claims priority from U.S. provisional patent application No. 60/194,232, filed Apr. 3, 2000, entitled "SYSTEM FOR ANALYZING MULTIDIMENSIONAL COMPUTER DATABASES", the disclosures of which are herein incorporated by reference in their entireties for all purposes.

The present application hereby incorporates in their entireties for all purposes patent applications entitled "Analytical Reporting on Top of Multidimensional Data Model", application Ser. No. 09/824,654, and "Report Then Query Capability for a Multidimensional Database Model", application Ser. No. 09/826,426, having the same inventors as the present application and filed of even date herewith.

BACKGROUND OF THE INVENTION

1. Field of the Invention

The present invention applies to the field of On-Line Analytical Processing (OLAP); and specifically, to the field of On-Line Analytical Processing that accesses relational databases.

2. Discussion of the Related Art

A significant advantage of an OLAP data source is that the data are organized in an understandable manner for the end user. The physical representation of the data is separated from the semantic layer presented to the end user. It can be very useful to help the end user to define this kind on layer on top of any type of data source. An ideal tool takes any heterogonous data source and displays the data in a unified semantic layer.

You can see each hierarchy that composes a dimension one different dimension by hierarchy.

According to the present invention, it is possible to map all relational models to OLAP models. The process is highly automated according to the present invention.

An OLAP data source is a database like a RDBMS. The OLAP model is similar to a data warehouse. It is composed of one or more fact table (multi-cube versus hypercube) and dimensions table links this fact table. In the OLAP model, you do not see the key and relation, only the useful object. The object is typed (dimension, measure, member) and presented in an organized manner. An OLAP data source use important abstraction between the data storage and the data representation.

Two differences between an OLAP data source and a RDBMS are evident: namely the speed and the capacity to perform complex calculations.

There is need to leverage the gap between the data sources capabilities to offer a generic query tool that is not dependent of the data source. A difference between the two models is the complex calculations such as row based calculations in the OLAP model. The row base calculations are possible, but very complicated with a RDBMS and the SQL language.

A foreign key is an attribute (or attribute combination) in one relation R2 whose values are required to match those of the primary key of some relation R1 (R1 and R2 not necessarily distinct).

BRIEF SUMMARY OF THE INVENTION

The community of OLAP vendors has established a set of de-facto standards to model multi-dimensional data representations. The most famous of these is the Microsoft's OLEDB for OLAP standard (ODBO), which is being endorsed by a vast majority of multidimensional databases and analytical tools vendors. This standard is well adapted to classical and somewhat limited analytical needs, but Analytical Reporting technology according to the present invention creates an opportunity to extend it in a powerful way.

A multidimensional data model according to the present invention has been established that is fully compatible with ODBO in terms of concepts, but extends it significantly.

The present invention includes several unique aspects.

All OLAP tools rely upon a preconceived storage of data to analyze. The data is usually stored either in a simple relational database, in which case the tool is called a Relational On Line Analytical Processing tool, or into a multidimensional storage, in which case the tool is deemed a MOLAP tool. Hybrid tools, that support both forms of storage, also exist.

ROLAP tools impose strong constraints on the underlying relational scheme. This scheme is necessarily either a snowflake or a star scheme, and additional constraints are usually set on how the fact tables or aggregate tables are built.

According to the present invention, relational data can be mapped onto an Extended Multidimensional Data Model regardless of the database scheme. From a Business Objects Universe built on top of the database, and possibly by adding some metadata, a multidimensional representation is derived for any relational database scheme.

According to the present invention, a Relational Database Management System (RDBMS) having any arbitrary structure is translated into a multi-dimensional data model suitable for performing OLAP operations upon. If a relational table defining the relational model includes any tables with cardinality of 1,1 or 0,1, the tables are merged into a single table according to the present invention. If the relational table is not normalized, then normalization is performed and a relationship between the original table and the normalized table is created. If the relational table is normalized, but not by dependence between columns, such as in the dimension table in a snowflake schema, the normalization process is performed using the foreign key in order to generate the normalized table according to the present invention.

Once the normalized table is generated, OLAP measures are derived from the normalized relational table by an automated method according to the present invention. In addition, OLAP dimensions are derived from the normalized relational table and the results of the OLAP measures derivation by an automated method according to the present invention.

Conventional OLAP tools do not offer such capabilities.

According to the present invention, it is possible to associate a member of a dimension to another member of the same or another dimension. This may be used freely when doing reporting or analysis. Thus according to the present invention, functional dependencies can be modeled. Functional dependencies cannot be captured by a pure multidimensional model. This aspect of the present invention makes it easy, for instance, to create a report that displays, for each country, the revenue generated worldwide by the sales persons who are located in this country. Conventional OLAP technologies are unable to allow the computing of this in a single step.

According to another aspect of the present invention, it is possible to create a new dimension of analysis, the members of which are all the different values that a scalar expression can take on. This aspect of the present invention allows for easy building of a matrix that yields the revenue per quarter and per year for instance. Conventional OLAP technologies are not capable of doing this in an automated manner.

According to yet another aspect of the present invention, it is possible to access the various instances of a Reporting Object as members in an OLAP dimension. This aspect of the present invention allows for the manipulation of one specific cell in one specific table, similarly to the way a spreadsheet operates. Conventional OLAP technologies do not provide for such fine-grained computations.

Some relational or multidimensional Databases possess so-called "opaque filters", therefore objects that will filter data in a way that cannot be exposed in a multidimensional model. An example of such filters is a complex "where" clause in an SQL statement.

According to the yet another aspect of the present invention, it is possible to apply these filters or a combination of them to the data that underlies analysis. Conventional OLAP technologies do not allow for integration of non-multidimensional filters.

BRIEF DESCRIPTION OF THE DRAWINGS

FIG. 6 illustrates a relational RDBMS that is normalized by dependence suitable for translation into a multidimensional OLAP model by the methods according to the present invention.

FIG. 7 illustrates a table that is not normalized that is suitable for translation into a multidimensional OLAP model by the methods according to the present invention.

FIG. 8 illustrates a table that is normalized, but not by the dependence between columns suitable for translation into a multidimensional OLAP model by the methods according to the present invention.

DETAILED DESCRIPTION OF THE INVENTION

Figure 1:
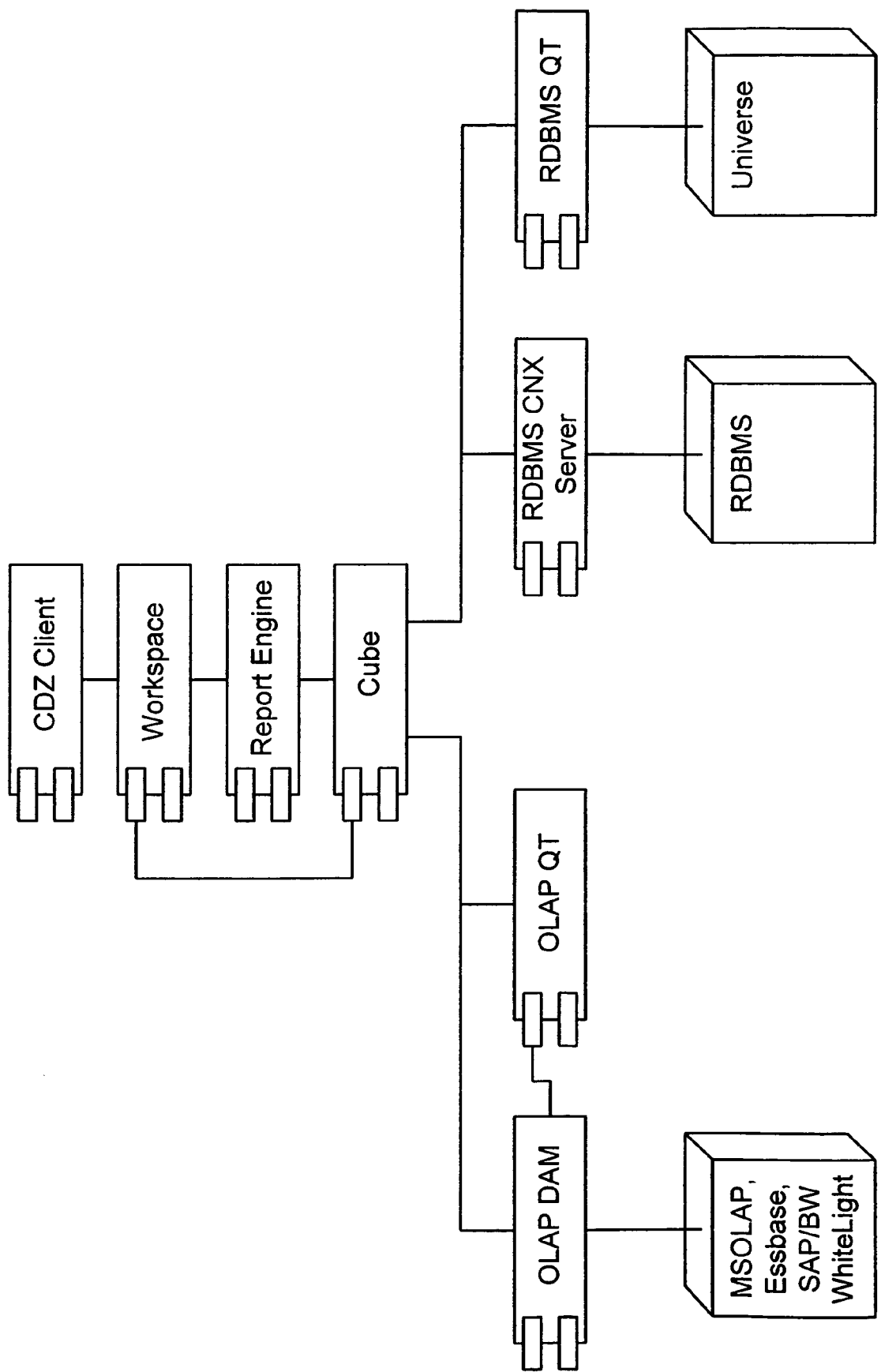
FIG. 1 illustrates a high level architecture in which the methods according to the present invention are performed.

There are differences between an OLAP data source and an RDBMS data source. According to the present invention, it is possible to pass from an RDBMS data model to an OLAP data model.

A goal of Cadenza is to have a generic tool that uses these data sources with a facility to manipulate, explore, and create report.

Another goal of Cadenza is to create a reporting tool that uses Business Object's Universe and OLAP data sources indifferently.

Cadenza will provide access from the Web to RDBMS and ODBO sources.

The access will be through a Data Source and we should be able to modify it in order to add, delete or modify all Data source components (objects, filters, drill path) that are part of the Data Source.

Mapping the Two Models

Map Relational Model

The relational model is composed of:

Table
Column
Row
Primary key
Foreign key
Relation
Cardinality

The OLAP model is composed of:

Dimension
Member
Measure
Level
Hierarchy
Space, cube or hypercube

A table is similar to a dimension and hierarchy. A column is similar to a level and measure. A row is similar to a member. The relation (composed of a primary and a foreign key) defines the hierarchical organization of the level and the space associate to a measure.

This model is valid only when the RDBMS is completely normalized by dependence. When the model is not normalized, the process is similar to normalize the model by this dependence.

Normalized Model

FIG. 6 shows a normalized model by their dependence. The arrows identify the direction of the data decomposition. A normalized model does not contain derived column, such as column profit that are the difference between the column cost and the column price sale.

The rules according to the present invention automate the transformation of a relational model into an OLAP model and use the relational schema shown in FIG. 6 as an example.

A primary and foreign key can be compound. In this case, the primary or the foreign key refer to all columns that compose it. In this process according to the present invention, it is preferable to use only one iteration for recursive relation. When the user need more than one iteration, he can specify on the option or a dialog can be prompt for the specification.

Measures for the multi-dimensional model are defined as follows:

Step 1: Create a list 'B' with all tables that don't have a referenced foreign key from other table, excluding recursive relation. In the example, the table ORDERS is found.

Step 2: Use the list 'B' and create a list 'M' of all columns that are not a primary key or a foreign key and that are numerical. This column defines the most common measure available. The method creates a measure by applying SUM, AVG, MIN, MAX or any other aggregation except COUNT. This defines measures of category 1. In the example, you find the columns SALES. The measures SUM(SALES), AVG(SALES), MIN(SALES), and MAX(SALES) can also be created.

Step 3: Use the list 'B' and add one measure in the list 'M' for each table. This measure is a COUNT of the number of rows in each table. This define the COUNT(*). This defines measures of category 1. In the example, the measure COUNT(*) is added on the table ORDERS.

Step 4: Add one measure in the list 'M' for each table not in the list 'B'. This measure is a COUNT of the number of rows in each table. This defines the COUNT(*). This defines measures of category 2. This type of measure counts the number of members of an upper level in a dimension. It can be interesting to have a measure that counts the number of employees on a department. It is not a very common measure and thus could create confusion when the OLAP model is built. In the example, the method creates the COUNT(*) on the tables CATEGORIES, PRODUCTS, COUNTRIES, STATES, CITIES, CUSTOMERS and AGE_GROUPS.

Step 5: The method then finds other measures in table that are not in the list 'B'. This measure is defined on columns that are numerical and can be defined as attributes (look the next section for more detail). If the method defines that this column is a measure, it therefore cannot define the same column as an attribute. This defines a measure of category 2, and the method can create a measure by applying SUM, AVG, MIN, MAX or any other aggregation except COUNT. In the example shown in FIG. 6, the method does not find any. But, if the method were to add a salary in the table customer, this column can be an attribute or a measure. The default is an attribute, but the method according to the present invention can alternatively select that is a measure.

Step 6: The name of the measure is composed of the column name and the aggregation used on the column. In the example, you have the measure the SUM of SALES.

The above method according to the present invention defines all possible measures. The user can select the measure that he needs from a list of all measures.

The following describes a method according to the present invention of assigning dimensions in the OLAP hierarchy.

Step 1: Create a list 'A' with all tables that don't have any foreign keys, excluding recursive relation. In the example shown in FIG. 6, you find the tables CATEGORIES, COUNTRIES, and AGE_GROUPS.

Step 2: Define one hierarchy by table found in the list 'A', and associate the hierarchy to this table.

Step 3: For each hierarchy, add the first level 'ALL'.

Step 4: For all tables not in the list 'B' (see step for measure), create a level and their attributes if available. In the example, the tables CATEGORIES, PRODUCTS, COUNTRIES, STATES, CITIES, CUSTOMERS and AGE_GROUPS are not in the list 'B'.

Step 4.1: A level other that the 'ALL' level is defined by two columns. One column that defines the member key that identify uniquely this member inside this level and another column that define the member name. The member key is the primary key of the table. The member name is column that is not primary key and foreign key. In the case where you have more than one column, use the column that have the bigger number of distinct value or when this equal, the first column on the table declaration. In the example, you create level on table CATEGORIES, PRODUCTS, COUNTRIES, STATES, CITIES, CUSTOMERS and AGE_ GROUPS. The level for the table PRODUCTS is composed of the column PROD_ID for the member key and the column PRODUCT for the member name.

Step 4.2: The other columns that are not primary or foreign key and not used by the level member name define an attribute if this column is not used to define a measure. An attribute is similar to a level and can be interchanged with the level. The user can decide to interchange the default level by an attribute. An attribute is composed of the same key as the level, but use other column as the column used for the member name and available on the table. In the example, the attribute ALIAS is found on the table CATEGORIES and ADDRESS on the table CUSTOMER. The attribute on the table CATEGORIES has a member key (same as the level) CAT_ID and the column ALIAS is the member name.

Step 4.3: The name of a level is preferably the name of the table where the level is defined. The name of an attribute is preferably the member name column.

Step 5: Complete all hierarchy by using relations between tables. The objective is to place a level on a correct order under each hierarchy.

Step 5.1: For all hierarchies, find the level on the same table as the table associated to the hierarchy.

Step 5.2: Add the level under the level 'ALL' of the appropriate hierarchy. In the example shown in FIG. 6, one hierarchy can start on the table COUNTRIES. This hierarchy has the first level ALL and under it, you add the level COUNTRIES.

Step 5.3: For each hierarchy, take the table of the last level. If this table has foreign keys on other tables, add the levels of this table under the last level. In the example, you have the hierarchy that start on the table COUNTRIES with two level, ALL and under COUNTRIES. The table of the last level is COUNTRIES. This table has a relation to the STATES table and a level STATES is defined on it. This level is added under the level COUNTRIES.

Step 5.4: For each hierarchy that has more than one level on the leaf, creating a copy of the current hierarchy for each leaf. This is when a network hierarchy is seen. In this case, each branch creates a new hierarchy. The example doesn't contain this type of configuration.

Step 5.5: Return to step 5.3 and repeat the process until hierarchy grows.

Step 6: Create one dimension for each hierarchy that has a different leaf level. In the example, two hierarchies are found that terminate on the level CUSTOMERS. A dimension can be created with these two hierarchies according to the present invention. Another dimension can be created with the single hierarchy built on the table CATEGORIES.

Step 7: When a measure of category 2 is defined, each dimension has to be revised with more than one hierarchy.

Step 7.1: For all measures of category 2, a level is built on the same table. In the example, a measure of category 2 is defined on the table CUSTOMERS.

Step 7.2: For all levels found, identification of the dimension composed of more than one hierarchy and that have at least one hierarchy use this level. In the example, the level on table CUSTOMERS is used by a dimension with two different hierarchies.

Step 7.3: For this dimension, if the level upper to the level where the measure is defined is not a level common to all hierarchies, create a new dimension with all hierarchies that do not share this level. The most drastic change is that each hierarchy becomes a dimension. Deleting all degenerated hierarchies, which have only the level ALL. In the example, when a measure is defined on the table CUSTOMERS, the dimension with two hierarchies ending on this table is split in two different dimensions. The reason is that the level upper to the level on the table CUSTOMERS is AGE_GROUPS for one hierarchy and CITIES for the second. These two dimensions don't have a common level.

Step 8: The name of all hierarchies is preferably the name of the tables associated to this table.

Step 9: The name of the dimension is the name of the table of the leaf level common to all hierarchies. When a measure of category 2 is present, the name of the dimension is the name of the table of the level upper to this measure. When more than one measure of category 2 is present, use the upper level found for all measures.

The dimension, hierarchy, and level associated to a measure defines the space or the data that can be found in the cube associated to this measure. This defines the scope of permitted query on this measure. This defines the best manner in which to group data associated to a measure. This is not necessarily pertinent for a tool that is not an OLAP server, but helps to understand.

Step 1: Group all measures on the same table. In the example, all measures on the tables SALES are grouped.

Step 2: Create a cube for each group composed of only one measure and creating one hypercube for each group than contains more than one measure.

Step 3: The Dimension, hierarchy, and level associated to a cube or hypercube is defined by the intersection of the table the measures and the level is defined. The method adds to the cube all dimensions that have a level on the same table that the measure or that the next table to the leaf level is the table of the measures. If the level is on the same table as the measure, only one level upper to this level is included in the space.

Step 4: A physical cube and hypercube can now be created.

The space of a measure defines the query available along measures. If the query is out of this scope, it is because no answer exists in the multidimensional model.

When the methods according to the present invention are applied to the relational schema in the example, you finish with these results, depending of the measure selected.

First case: Only measure of category 1.

One hypercube with five measure: SUM of SALES, COUNT of ORDERS, MAX SALES, MIN SALES, AVERAGE SALES.

Two dimensions: CUSTOMERS and PRODUCTS.

The dimension PRODUCTS is composed of two levels: CATEGORIES→PRODUCTS. The CATEGORIES level has the attribute ALIAS.

The dimension CUSTOMERS is composed of two hierarchies: AGE_GROUPS and COUNTRIES.

The hierarchy AGE_GROUPS is composed of two levels: AGE_GROUPS→CUSTOMERS. The CUSTOMERS level has the attribute ADDRESS.

The hierarchy COUNTRIES is composed of fourth levels:
COUNTRIES→STATES→CITIES→CUSTOMERS. The CUSTOMERS level has the attribute ADDRESS.

All dimensions appear in the hypercube.

Second case: Include one measure of category 2 (count number of customer).

One hypercube with five measure: SUM of SALES, COUNT of ORDERS, MAX SALES, MIN SALES, and AVERAGE SALES.

One cube with the measure COUNT CUSTOMERS

Three dimensions: CUSTOMERS, AGE_GROUPS, and PRODUCTS

The dimension PRODUCTS is composed of two levels: CATEGORIES→PRODUCTS. The CATEGORIES level has the attribute ALIAS.

The dimension CUSTOMERS is composed of four levels: COUNTRIES→STATES→CITIES→CUSTOMERS. The CUSTOMERS level has the attribute ADDRESS.

The dimension AGE_GROUPS is composed of two levels: AGE_GROUPS→CUSTOMERS. The CUSTOMERS level has the attribute ADDRESS.

All dimensions appear in the hypercube.

Only two dimensions appear in the cube: AGE_GROUPS and CUSTOMERS.

For the dimension AGE_GROUPS, only the level AGE_GROUPS is in the cube.

For the dimension CUSTOMERS, only levels COUNTRIES→STATES→CITIES are in the cube.

No Normalized Model

When the model is not completely normalized by the dependence, a method according to the present invention is to normalize it and then to apply the process described for normalized model. Many types of patterns may need to be resolved according to the present invention before starting the transformation.

Type 1: A table that is not normalized, such as the table customer with the column city, state, and country in FIG. 7.

Type 2: Two tables with relation of cardinality 1,1 or 0,1.

Type 3: Table normalized, but not by the dependence between column, such as a dimension table in a snowflake schema.

According to the present invention, all types of non-normalized patterns are found, how you could normalize it.

Type 1

The normalization is done by creating in a virtual manners the table needed and the relationship between this new table.

Step 1: The method calculates the number of distinct value of each column. A select statement with a count distinct on each column, except the columns of the primary key that is a COUNT(*), can perform this step.

Step 2: The columns that have a very similar number of distinct values as the number of rows defines the column associated to this table and become level or attribute. This column with the primary and foreign key columns defines the column associate to this table and becomes the table ORG.

Step 3: For all columns not collected by the step 2, group columns that are similar. Two columns are similar when for each row, the same pair of values are found. This column defines a new level and attribute. A group can be composed of only one or more than two columns.

Step 4: Order groups by the ascending number of distinct values. When a group is composed of more than one column, use the column with the greatest number of distinct values. This create the list ORD.

Step 5: Take the first group on the list ORD and remove on this list. Add this group on the list TOP. If the list ORD is empty and the list TOP contains only one group, create a table with a relationship to the original table and stop the process.

Step 6: Check the distribution of the group on list TOP along a group in the list ORD. Use the column with the greatest number of distinct values in each group to complete the process.

Step 6.1: If the list TOP is empty, go to the step 5. Take a group on the list TOP and remove it. This removed group becomes the group PARENT.

Step 6.2: Take the first group on the list ORD that have more distinct values than the group PARENT and not already define in the children associate to this group or used previously. This group becomes the group CHILDREN. If no group is available and the group PARENT does not define a table with a relationship with another table, this group defines a table with a relationship on the table ORG and goes to step 6.1.

Step 6.3: Distribution

If the distribution of the distinct values from the group CHILDREN along the group PARENT are uniform, this creates two tables with a relationship. When a table is already defined for a group, reuse the table and then go top the step 6.1 else, the group CHILDREN becomes the group PARENT. Go to the step 6.2.

If the distribution of the value define a repetition like a Cartesian product, this define that the group CHILDREN defines a new hierarchy. If the group PARENT defines a table with a relation with a parent group, add this group on the list TOP only if this group is not already used by this group, else add the group CHILDREN on the list TOP and remove the group CHILDREN from the list ORD. Go to step 6.2 in two cases. A data mining tool can be used to retrieve these dependences between columns.

The last part of the algorithm with the table composed of this column: C0, C1, C2, C3, C4, C5 and C6. The column C0 defines a group that contains the primary key and the column associate. These columns ordered from the column that has the least distinct value to the greatest: C4, C5, C3, C1, C2, C6. The result is: C4→C1, C4→C3→C2→C0, C5→C2 and C5→C6→C0. This defines the column that her distinct values are distributed uniformly along the parent column.

Type 2

Merge the two tables into a single table.

Type 3

Use the step defines for the type 1 on the foreign key and it is evident how these tables can be reorganized. The result defines the configuration of the foreign key in a new manner. The method according to the present invention replaces the table defined by the foreign key in the original table.

Map the OLAP Model

An OLAP model can be mapped into relational model. The result is a data warehouse.

Step 1: Each cube and hypercube becomes a different fact table with measures.

Step 2: Each dimension becomes a table. The leaf level defines the primary key of the table and you add a relationship to the fact table for each cube or hypercube that use this dimension.

Step 3: Each level of all hierarchies inside a dimension become column on the table associate to this dimension.

Step 4: Unbalance and ragged dimension need to add null values on the dimension table to create complete it. This null value is added where the level does not have the value for a children member or a parent member.

Duplicate Value

An OLAP data source never contains duplicate values. If an RDBMS is passed into an OLAP data source, and after then the transformation is reversed, duplicate values are lost. All duplicates values are aggregated into a single value. An OLAP data source does not contain duplicate values, because the OLAP technology is based on matrices. A matrix is a coordinate system. In these kinds of system, you do not have the same coordinate for two different objects, such as a graph.

When an OLAP data source is accessed, an option that specifies whether or not duplicate values are needed is not pertinent for a single data source. If the data come from different data source, one value can be received on the same coordinate from each data source. This occurs in the case of virtual data sources, and each data source is accessed separately.

Create Group

When a new object is created that groups data from a class, there is no constraint to put values in a particular disposition, because objects on a class do not have any dependence that links objects in a hierarchical form and not necessarily defining a drill tree.

When a new level is created that groups members from a level of any OLAP data source, a new intermediate level or a new hierarchy can be created. This is defined by how the members are grouped. The differences become of the fact that levels on a dimension define a hierarchical organization of the data. If this hierarchical organization is cut, a new hierarchy is built, but if this hierarchical organization is respected, a new intermediate level is built.

This is also for drill hierarchy, because a drill hierarchy must define the member in a hierarchical form where the children of a member are exclusive to this parent. When a drill is performed in a different way and the same members are found, it is because drilling is performed along two different hierarchies.

We use an example to explain the difference between the creation of a group that defines a new level and a group that defines a new hierarchy. This example uses the dimension time with two levels, year and quarter.

A group can be defined on the level quarter. This group defines the level semester. The level semester adds an intermediate level between the level year and quarter, because this level creates a group that respects the actual organization of the member along the dependence between the level year and quarter. The new group does not define a member that groups children from two different parents.

A group can be defined on the level quarter that groups members from two parents. In this case, the level year can be a level upper to this new level. This defines a new hierarchy on the dimension time with two levels: S and quarter.

A new level that becomes an alternate level to other level defined by a group can also be performed. This occurs when these levels are defined on the same level. The levels only define two manners to group the same member. The second group defines a new hierarchy. In the example, the level T is defined on the same level that the level semester.

Default Member

Another important difference between an RDBMS and an OLAP data source provides the fact that the OLAP data source define a data organization. When the administrator of a OLAP data source decides that a dimension doesn't have the level ALL, the administrator decides for the end user that is not possible to see data for all years because this are no signification. When the user looks at her data, this data is always for a specific year.

A RDBMS data source doesn't have this kind of specification. If the user look at the data, this data is always for all year.

This difference can be resolved by adding the level ALL to all dimensions that don't have it. In this case, you lose the ability for the administrator to define this kind of constraint that prevents the user from seeing data out of signification.

Another possibility is to define in the Designer a new constraint on an object. This constraint defines that this dimension is always seen to be a particular value anytime and the administrator can select the default value. This define a mandatory filter and the user can only change the value associate to it when he needs the other value than the default.

Calculate Member

An OLAP tool has facility to create calculate member that are variable in BusinessObjects. A calculate member is along a dimension. In general, OLAP tools display calculate member with other member on the dimension, at the same level that the ALL member.

Universe

End-users can browse Universe and OLAP data sources in a unified and common outline according to the present invention.

A Universe is constituted of classes and objects. A class is a container of objects that can be dimensions, measures or detail. It is recommended, but not mandatory, to position dimensions in a hierarchical order, like an OLAP level. A dimension can have details associate to it. A class can be a subclass to another class.

A multi-dimensional database or OLAP cube is constituted of dimensions. Each dimension is composed of members grouped into levels. Each dimension is organized in a hierarchical manner. A level has members associate to it. A dimension or level can have properties. These properties are associated to all members associated at the dimension or level. A dimension can be composed of more than one hierarchy of levels. This is called multi-hierarchy. All measures are grouped in the measure dimension.

These two models have many similarities. According to the present invention, these two models are merged in one common model with a nomenclature to name and define each concept.

A goal of the present invention is to have Cadenza's display of metadata objects in the data outline with respect to the actual Universe definition.

Essbase, Metacube, and other OLAP providers are discussed herein. A goal is only to have a unified metadata objects definition in the data outline that covers all data source in a unified model.

Feature Description

Data Outline Definition

This section defines the metadata objects in the data outline from Business Objects Universe or multi-dimensional database are seen. This description of how appears the metadata objects from a data source is not only true when the user browse the data outline, but in all other dialog or interface that display metadata objects.

Data Source

A data source is an OLAP connection plus possibly other objects such as variables. A data source is also a Business Objects Universe.

Metadata Objects

The metadata objects are objects that define a data source.

Universe: Class, Dimension, Detail, Measure and Member.

OLAP: Dimension, Level, Hierarchy, Member and Measure.

Universe

The universe is a semantic layer between the user and the database. It is created with BO Designer. The universe consists of classes and objects. The objects in the universe map to data in the database, and enable you to build queries on the universe when creating or working on reports.

Data Outline

The data outline is defined by the list box that appears when the user click on the tab DATA in the Cadenza Web panel.

Data Outline Mode

The two radio buttons at the bottom of the data outline panel defines if the user browses the metadata objects in structure mode or in values mode.

How Appears Metadata Object in the Data Outline

The metadata objects are available in the data outline. The metadata objects appear at the top most of the data outline, under the data source folder. The icon is followed by the name (caption) of the data source.

The metadata objects at the first level are composed of classes and dimensions.

OLAP Data Source

Dimension

An OLAP dimension is a structural attribute of an OLAP cube that is a list of members. The blue cube is the icon that defines a dimension.

Measure Dimension

When dimensions appear in the data outline, in general, you find at least another dimension that contains all measures. This dimension is the measure dimension and is called "Measure" by default (i.e. if no name is associated with the measure dimension). The measure dimension contains only measures and is defined by a folder. The data source can use another name for this dimension, like Essbase where this dimension can be called "Account". More than one measure dimension can not be found. If the data source like Metacube has more than one measure dimension, all measures are added in the unique measure dimension and the dimension associate to these measures are displayed only one time, not in two different sections like in the OLAP access pack for Metacube. When two measures have the same name, this name is prefixed by the cube or fact table name.

When the OLAP database doesn't have an explicit measure dimension, the first dimension found becomes the measure dimension. This case can occurs with Essbase. The workflow is the same as the OLAP access pack for Essbase, but the measure dimension cannot be changed. When no measure dimension is specified and the default measure dimension is not the dimension wanted, the user has to edit its data source with the proprietary tool to specify the wanted measure dimension.

Time Dimension

When the time dimension is explicitly defined from the data source, this dimension appears with a different icon to identify the time dimension. This special dimension can be identified in ODBO data source.

Level

A level is used to group members of a dimension in a hierarchical manner. The ordering which the level appears inside a dimension defines the hierarchy between each level. An icon is used to identify a level.

A dimension with only one level doesn't display this level (levels are identical to the dimension in this case). When an object doesn't add any information that the parent object, this object doesn't appear in the data outline. This object is redundant.

Property

A property is used to associate detail to a member. The property appears only when the user browse metadata objects in structure mode. In this case, if properties are associated to one level, the user can open the level to see the list of properties associated to the level. An icon is used to identify a property.

A dimension with only one level doesn't display this level (levels are identical to the dimension in this case) and the properties are associated directly with the dimension.

A property can be available to all members along all levels. This type of property is associated with the dimension. SAP BW has this type of properties. In this case, the properties are added to each level.

Member

The members compose a dimension. The members appear only when the user browses metadata objects in structure mode. In this case, he can see members associated with each level of a dimension. An icon is used to identify a member. The user can start to browse the members at any level. When the user opens one level, he sees all members associated at this level. The user can look at the children of these members. In this case, the members of the next level appear. The user can browse members from the top to leaf in the same way as all OLAP tools. But, the user can start to browse at any level.

When a dimension has only one level, like SAP BW, this level doesn't appear and the user browses the members directly under the dimension. The members will be displayed in the outline according to the server's natural order.

Number of Members

The number of members indicates the number of members that will appear when the user opens the node. This number appears between parentheses after each level name and member name. This number also appears for a dimension, but this number is not the number of children that will appears if you open the node, but the number of members that contains the dimension. This number can be an approximation, not the real number of children.

This number appears if it is available in the data source (i.e. it is not necessary to scan the data source to define this number when not available). The number becomes the real number when you open the node the first time. When the number of children is unknown the "??" appears instead of the number of members.

Examples: CANADA (??).

When a member doesn't have any children, the parentheses that indicate the number of children is hided. The absence of the "+" before the member indicate the fact that this member doesn't have any children.

Hierarchy

The hierarchies are used when it is possible to have more than one way to aggregate the data or group the members along the levels. Each hierarchy has the same leaf members, but aggregate the data in a different way.

A dimension can be composed of more than one hierarchy. In this case, when you open Cadenza, the dimension appears in the data outline for the default hierarchy:

The dimension name is: Dimension name+space+hierarchy name. This name is only for the data outline. See the Object Name specification for more detail about how this name appears in a formula.

The user can use the right-click (contextual menu) on the dimension to change the used hierarchy or to split each hierarchy into separate dimension. Only available for dimension with more than one hierarchy.

| Menu part | Description |
| --- | --- |
| Hierarchy | The list of all hierarchy associated with the selected dimension. The default hierarchy is choosed the first time the user open this dialog. The user uses this list box to select the wanted hierarchy. This defines the hierarchy used for this dimension. |
| Create separate Dimension from each hierarchy | A virtual dimension will be added in the data outline for each hierarchy contained in the dimension. |

All items in the submenu are exclusive. When one item is selected, the old selected item is unselected.

Icon

The dimension icons differentiate the dimensions with more than one hierarchy from the dimensions with a single hierarchy. For a dimension with more than one hierarchy, a little hierarchy symbol appears in the top left part of the dimension icons.

Measure

The measure dimension contains the measures. A measure is a subtype of member. The user can find measures under a measure, like with Essbase. The measure dimension also show levels like other dimension. Essbase supports named level in the measure dimension. This section only defines the difference with other members. An icon is used to identify a measure.

Universe Data Source

The Universe is displayed in the data outline in the same way as BusinessObjects 5.x in the query panel.

Class

A class is a logical grouping of objects inside a Universe. A class is a container and can contain subclasses, dimension, and measures. The following icon is used to identify a class.

Dimension

The dimension from a UNIVERSE data source is similar to a dimension from an OLAP data source. The dimension from a Universe has the same icon than a dimension from an OLAP data source.

U.S. Pat. No. 5,555,403 describes a relational database access system and method that provides a data representation and a query technique which allows information system end users to access (query) relational databases without knowing the relational structure or the structure query language (SQL) utilizing semantically dynamic objects. The present application hereby incorporates U.S. Pat. No. 5,555,403 by reference in its entirety for all purposes.

Difference with an OLAP dimension:
The dimension from a Universe is a mono-level dimension.
The default member of any dimension from a Universe is the "ALL" members
The "ALL" member doesn't appear in the members associated to the dimension. When the dimension is not used, this defines that the default member will be used.

When a prompt is associated to a dimension, the user can't open this dimension to see members associated to it. The user can only use this object in the document. The prompt appears when the user refreshes its document.

Member

Identical to member defined for an OLAP data source. The list of member never includes duplicate values (i.e. it is equivalent to perform a SELECT DISTINCT on the column that define the dimension). An icon is used to identify a member.

Measure

The measures in a Universe are not associated with a measure dimension. The measure appears in any class. Because the measures are not associated with a dimension, the measures appear in structure mode. An icon is used to identify a measure.

Measure Dimension

To ensure a coherent behavior for the OLAP and Universe data source over the product (filter zone, formula, and block), the measures are grouped inside a measure dimension. All measures found in a Universe become members of the measure dimension.
This dimension is added automatically to a Universe in Cadenza when it contains one or more measures.
This dimension is added at the end of the outline, i.e. after the last class.
The name of this dimension is "Measures" and is localizable.
The name of the measures that appears in this dimension is the measure SNAP name, but without the delimiter ([,]) and the point (.) between each subpart of the SNAP name is replaced by the blank char.
If the measures SNAP name is "[Class].[Sales]", the measure name will appears in the measure dimension like: "Class Sales"
When this dimension is used in a formula, the SNAP name is used like for any object used in a formula.
The icon for this dimension is the same as the OLAP data source.
Note: The measure is not removed in the classes, it now appears in two separate places, but it is the same object with the same behavior.

Detail

A detail is used to add extra information to a dimension. The detail used without the associated dimension has the same behavior than a dimension inside a report. The following icon is used to identify a detail.

New Calculated Member

Calculated members locally defined are added to the formula or variable section. Calculated members from the data source are viewed like other members in the data outline.

Database Order

The members in the data outline appear in the database order. The user cannot apply sort to change the order in which the members appears in the data outline.

The database order defines the order used to apply operator like ">" on members. For example, if the user put a condition like "YEAR>1995", this returns the following members to 1995 in the database order.

The database order in the data outline defines an important referential point for all operators used to filter a dimension.

Universe Data Source

The database order for member that comes from a RDBMS is preferably the RDBMS ascending sort. This is also valuable for List of Values (LOV), i.e. the dimensions that are defined by a prompted LOV.

OLAP Data Source

The database order for member that come from an OLAP data source is always the natural order. The natural order is the order that appears for the members in the data source. The administrator of the data source defines this order.

Loading Metadata Objects

All metadata objects are loaded in the data outline when the user launches Cadenza. The only exception is the members that are loaded only when needed by a specific action (this exclude the measures, that are loaded like other metadata objects). All members from all dimensions are not loaded when a user launchs Cadenza.

Large Number of Members

When the number of children under a node is too large (more than 1000) to be displayed, a message appears.

ToolTip: Unique Name

A unique name identifies a metadata object. When the user creates a formula, it is the name that guarantees that the user refers to a specific object without any confusion.

This name is not the system unique name, but the path from the root to the specific object. Anywhere in the outline, when the cursor is over an item that has a unique name, a tool tip display the unique name associated to this object.

Expand All

Expand and display all the descendants of the selected object. If you are on a level, this expands all members under this level recursively to the leaf. If you are on a dimension level, this displays all values associated to it.

Product/Module Tie-In

To display the new concept, the applet needs to differentiate between objects from a Business Objects Universe and objects from a multi-dimensional database. This distinction is not the data source, because a next version of the Designer can perhaps create OLAP dimension and VDS can perhaps merge Business Objects Universe a multi-dimensional database.

Search Objects

Because the number of objects on the data outline can be very large, you can use "Find" in the contextual menu to rapidly locate a particular object. For the first time, you have to enter a search pattern. After that, just push the "Find Next" button on the dialog. The nodes are expanded automatically and the next node that matches the pattern is selected. The searches start on the current position on the outline and are go downward. The process begins with the node under the initial node.

| Functionality | Description |
| --- | --- |
| Drop down | List of the last 10 patterns used previously in the current session. |
| Match case | Match pattern by holding account of uppercase and lowercase. |
| Whole word only | Match pattern only when we find the exact word. |
| Select all matches | Do not find only the first pattern find, but all and select them. See next section for more detail. |
| Text appears at beginning | Match pattern at the beginning of the word only. |
| Text appears at end | Match pattern at end of the word only. |

The search can be performed on a property value.

The user can specify that he needs a research on a specific level or on all children.

What is the cost associated to the find next. This needs to query the server each time.

Messages

When no member/value match the text, a message indicates that no match is found.

When the search is finished, a message indicates it.

Select All Matches

When this option is selected, the dialog disappears when you click find next. The first time you perform a search on all matches, the find folder is added at the end of the edit panel. The pattern used to perform the research is an item added under the find folder with the find icon. The name of the item is the pattern used. All objects found are added under this item. In the case where objects have children, you can explore under the found item, like in the other part of the outline. The item with the search pattern is selected and expanded. The user can delete this research. When all research is deleted, the find folder is removed. The user can delete all research by deleting the find folder. The user can use the right click menu or the delete key to perform the action.

Administration

A data Source is a set of metadata, presented as a collection of MD reporting objects (Dimensions, Hierarchies, Levels, Members Measures, etc), that map a physical data source (Universe or ODBO source) and include all public components defined in the Cadenza Administration applet by the Designer (new objects, filter, drill path).

The Data Source will be managed by a specific user profile "Designer of the Data Source".

The Cadenza Administration Applet will be loaded from Infoview by choosing "Edit Data Source". This option is available only for the Designer of the data source. This applet allows the Designer administer the Data Source. In fact, the universe objects are managed through the BusinessObjects Designer Module, the ODBO objects are managed through the OLAP Database admin tool, and all the other components (declared as public components) are managed through the Cadenza Administration Applet.

A data source is created automatically starting from a universe or an ODBO source. So each object from a universe is linked to a cadenza object. In the same way, each data available from an olap database is linked to a cadenza object.

For one universe, we have one and only one Data source in Cadenza.

For one ODBO source we have one and only one Data source in Cadenza.

Then, the Designer can enrich the data source definition by creating new objects, filters or cadenza drill path.

A detailed description for each components and functionalities of administration follows.

Workflows

Create A Data Source

A Data Source is created by the System from a universe definition or from an olap database.

Choice and Display A Data Source

If the user is logging in with a profile "Designer" and you can administer the Data Source, you will see the screen below in Infoview with the "edit Data source" feature.

When the Designer of the Data Source chooses "Edit Data Source", Infoview displays the list of accessible Data Sources according to the right of the Designer. For each Data Source, Infoview displays the status of the Data Source (empty, working, locked). The Designer can select only the Data Source with the status empty or working which means it is an available Data Source for the Designer connected. So, an available Data Source is a Data Source that is not locked by another Designer.

The empty status means that no designer is updating the data source.

The working status means that the designer connected is updating the data source, so a local copy exists and he can load it and continuing to update the data source.

The locked status means that another designer is updating the data source.

1. If no Data Source is being updated, Infoview displays all available Data Sources. The Designer can choose any one.

2. If a Data Source has been locked by the designer connected, Infoview displays all available Data Sources and displays the copy of the locked Data Source with a status Working. The status "working" means that this Data Source is being updated and that there is a local copy.

3. If a Data Source has been locked by another Designer, Infoview displays all available Data Sources. So the locked Data Source doesn't appear or appears but with a status "Locked".

The Designer knows that he can't update it because it is already being updated mode by another Designer.

If a designer tries to edit a data source that is locked, a message must appear telling him that he can't edit a data source locked by another designer.

Choosing a Data Source in Working Mode

Only the designer who had edited it before shows the 'Working' status for this Data Source. This status means that the designer has a local copy of the Data Source on the server and he can continue to work on it. When the designer wants to edit this Data Source in 'Working' status it means he works on the copy of the data source.

This Data Source appears in the 'lock' status for the other Designers.

Choosing a Data Source that is not locked

When a Data Source has been chosen, Infoview has to lock the Data Source and the universe or ODBO connection corresponding. The status of the Data Source and the universe or ODBO connection must change to locked. A copy of the Data Source must be done on the Server and the Designer must work on it. The status of the Data Source, universe or ODBO connection must stay "Read Only" until the Designer has exported the new definition of the Data Source. When a designer decides to export a Data Source, the copy must replace the original data source. All the components of the Data Source must be stored in the resource manager system. The data source must be unlocked and the date of the Data Source must be updated.

Another Designer in Edit mode can't use the Data Source that is locked until it is unlocked by an export.

Check and Display the Data Source (Edit Data Source or Create Document from a Data Source)

Before displaying the contents of the Data in the Cadenza applet (choose "edit data source" or "create document" in Infoview), the system must check the integrity of the data source definition by comparing it to the universe definition or the Olap database definition. To verify the integrity, the system must compare the last update date from each source.

Case 1: The last update of the DS>=the last update of the universe→The Data Source content is directly loaded Case 2: the last update of the DS<the last update of the universe→The system must verify the integrity between the 2 resources and must update the data source content if some universe classes, objects or filters have been added or deleted.

The result of the comparison can provide different actions:

There are no addition and no suppression (no new classes, filters or objects in the universe and no deleted classes, objects or filters)→the Data Source content is directly loaded.

There are some additional components in the universe definition (classes, objects, filters)→the system has to add the new components in the Data Source definition by:

Creating a new cadenza class with the new objects if a new class has been added in the universe Adding the new object in the existing Cadenza class Adding the new filter in the cadenza filter folder There are some components, which had been removed from the universe;

Classes have disappeared, the system must check whether or not this class in the Data Source had contained only universe objects or not.

If this cadenza class that disappeared contained only universe objects or cadenza objects becoming unavailable, the system must delete the class in the Data source, If this class contains Cadenza objects again available, this class must appear in the Data Source with only the cadenza objects in.

Objects or filters had been removed; the system must invalidate all Data Source components based on the removed objects and notify the designer. These components must still appear in the data source outline but with a barred icon to show that they are invalid. The designer must be able to edit their definition to make it valid. The designer can also decide to remove them. To remove an object from the data source, the designer has to select it and choose the option 'delete' on the right click menu of the mouse or use the 'suppr' or 'delete' button on the keyboard.

Here in the example above, it is the filter 'Year 1993' that is invalid because this filter used in this definition the object Year that has been removed in the universe definition. So, the definition of the cadenza filter is not valid.

When some basic objects are removed from the universe or in the olap database, all the objects and filters using them must be listed and unavailable.

The system must propose to the designer the possibility to save the Integrity Check Results in a file (button Save as . . . ).

'Save as . . . ' button: load the dialog box Save As. The designer can save the result as a txt file. The name by default is check.txt. If a file with the same name already exists, the system must display a warning message to prevent the designer and ask him if he wants to overwrite the existing file or not.

After this verification, the Cadenza Administration Applet will be loaded with some additional features for updating and managing the Data Source like "check integrity", print Data Source, save Data Source . . . and with an administrator toolbar.

Update the Data Source

Cadenza Administrator Applet

The Cadenza Administrator Applet is loaded by choosing a Data Source in Infoview through the 'edit data source".

The outline is populated with a copy of the Data Source, the content of the shared folder in "Read only" and the content of personal folder in "Read/Write".

For information all purposes, when the Cadenza Applet is loaded when choosing "Create New Document", the outline is populated with the content of the Data Source, the content of shared folder and the content of the personal folder. The properties of these 2 folders shared and personal ("Read/Write", "Read only") depend on the rights of the user connected (rights declared and managed by the Supervisor module).

In the left part, you can see the Data Source components and the toolbars that the Designer can use to update the Data Source. The Right part allows the designer to test the new components (objects or filters) or to create them directly in the document.

The Data Source Designer toolbars proposes the following icons

Save Allows the designer to save "locally" the new definition of the Data Source on the server Print Allows the designer to print a description of the data source and its components Preview Allows the designer to preview how the information fits on a page. The designer should also check the margins and page borders.

Undo If the designer wishes to undo the action he just performed, he has to click on this button. We want to implement several levels for the undo action.

Redo If the designer wishes to redo its last action, he has to click on the 'redo' icon. We want to implement several levels for the redo action.

Check Integrity This feature allows the designer of the data source to obtain an automatic check for semantic or syntax errors.

Data Source Parameters Allows the Designer to change the parameters of the Data Source Detect Olap Allows the Designer to define a Cadenza Drill Path Add New Components The Designer of the Data Source has 2 workflows to create new components:

Define them by using the option "Insert . . . " and using the appropriate dialog box Define them by creating directly in the document and publishing them as a public component When the Designer creates a new component by using the option "Insert . . . ", the component will be saved in the folder selected.

For an object: in the class or the dimension folder selected
For a filter in the folder "Filters" or all sub-folders selected (except personal or shared folder)

The new component will be inserted in the Data Source definition as a public component. At the end of the definition, when the designer click on the OK button, a publish dialog box must be loaded to let the designer updated the name and write a description associated to the component. The description will be displayed in the status bar when a user will select this object later in the Data outline.

(see publishing specification and data outline specification).

When the Designer creates a new component in the document zone, the new component will be created as "a report component" and appears only in the "Report Map" tab. This new component depends on the report and not on the Data Source until the Designer has published it as a public component.

Add a New Folder (Class, Dimension, Subclass)

To create a new folder (class, dimension or subclass), the designer has to select a folder name and use the right click to choose "Insert class" or "Insert Subclass".

When the designer chooses "Insert Class . . . " or "Insert Subclass . . . ", a dialog box "Edit properties of the Class" appears to allows him to define the class (name and description).

If the designer clicks on the Cancel, the operation is aborted and the new folder is not created.

If the designer clicks on the "OK" button, the new class is created and appears just behind the class selected or in the class selected for a subclass.

If the name of the class or subclass already exists, the system must display a warning message to the designer.

We don't allow the designer to define classes or subclasses with the same name.

When the designer clicks on the 'OK' button, he returns on the class, subclass creation dialog box.

Add a New Object in the Data Source

The designer can build a new object in a class only for a RDBMS Source. For an Olap source, the Designer can't add a new object in an existing hierarchy. He has to create a new class or dimension folder before doing so (see the data outline specifications).

This object can have 3 types:
Dimension
Measure
Detail

We can define several types of objects:
1) Calculated object: based on a formula with a function of group
2) Dimension object: based on a grouping of values or based on a formula (if . . . then . . . else)
3) Time object When a new object is created, where is it inserted?

Select a class name and use the right click to choose "Insert object"

For a designer profile: means he wants to create a new object in the class selected For an end-user profile: this action is impossible Select an object in a class and use the right click to choose "Insert Object".

For a designer profile: means he wants to create a grouping values object depending on the values of the object selected and insert it before in the same class.

For an end-user profile: means he wants to create a grouping values object depending on the values of the object selected and insert it in the user defined object folder as a personal object.

So, in function of the level selected (class name, folder name, object name), the type of the object created can be different (grouping values, calculated object . . . ) and the screen to define the content of the object (formula or values) must be contextual.

Case 1: It is an object name, which is selected.

In this case, the user wants to create a grouping values object, so the "Insert object" option has to present him the grouping values screen.

The following screen appears to help you to define the new object Quarter. A name has to be given to this new object and group the Month values to define the Quarter values. All the values must belong to a group. If it is not the case, the system will automatically create a group "others" that regroups all unused values. The next time if a new value appears in the Database, it will be automatically added to the group 'Others'. If this group doesn't exist, it will be created. In the following example, the system will create a group "others" that regroups all unused values of month, so (7, 8, 9, 10, 11, 12).

The new outline display becomes:

Case 2: It is a class name or a folder name, which is selected.

In this case, the user wants to create an object based on a formula. So the "Insert Object" option has to present him the formula screen (see the formula language specification)

Each object inherits the security defined in the universe or in the Olap database. So, if a basic object is forbidden for a user, all the other objects using it must be forbidden too.

The formula language and the workflow used to create an object are described in another document (formula language specifications). All the objects of a class must have different names. So if it is not the case, the system must display a warning message to prohibits the creation.

When the designer clicks the 'OK' button, he returns on the object creation dialog box.

Add a New Filter in the Data Source

A filter is a named condition. A filter is linked to a Data Source. The workflow to create a filter is described in another document (filter & rank creation specifications).

All the filters must have different names. So if it is not the case, the system must display a warning message to prohibits the creation.

When the designer clicks the 'OK' button, he returns on the filter creation dialog box.

Create New Cadenza Drill Path

When the designer clicks on this icon, the following dialog box appears.

The left part of the dialog box proposes the data source definition. The Designer can find all the objects belong to the data source. He can decide to choose this definition as the drill path (object's order in the classes).

The right part of the dialog box "Custom Olap drill path" allows the designer to define a drill path different from the definition of the data source. The designer can reorganize the object dimension in OLAP hierarchies. If a custom hierarchy has been defined in the Designer Module of Business Objects Full/Client, the custom hierarchy will be displayed in the right part of the dialog box. The designer of the data source can update and complete it with new cadenza objects. To define a custom drill path, the designer can use the 'Add>>' button.

If no custom olap drill path was defined, the data source definition order is taken for the drill path.

This feature is also available for a data source based on an olap database.

Hide/Unhide a Component

The designer of the data source can decided to hide an object however whichever the origin (universe, olap, cadenza).

In this case, this object will be unavailable and automatically hidden for end-users.

This object can be used in the definition of another object.

The Designer of the Data Source can hide or unhide an object or a class independently of its status in the universe. The status in the Data source doesn't change the status in the universe but the status in the universe impacts the status in the Data Source. However, the Designer of the Data source can change the status of an object or a class in the Data Source. The following table summarizes the different cases.

| Status in universe/<br>Status in DS | Hide | Show |
|---|---|---|
| Hide | Hide in DS<br>Hide in universe | Show in DS<br>Hide in universe |
| Show | Hide in DS<br>Show in universe | Show in DS<br>Snow in universe |

If the designer decides to hide a class, all the objects belonging to the class are hidden. A class is hidden only and only if all the objects inside are hidden too.

It is the same for an olap dimension. If the designer decides to hide a level, all the children levels are automatically hidden too.

Publishing a Cadenza Component

According to his profile and of his rights, a user will be authorized or unauthorized to publish a cadenza component which means changing its type (public, personal or shared). According to its profile, he can also move or not move a component from a folder to another by drag & drop.

The designer of the Data Source can move a personal or shared component from the user defined object folder to a class or dimension folder. In this case, the type of the object changes to public automatically.

He can also change the type of a personal component to shared component, for this action, he has to change its type by changing its properties (see publishing specification).

An end_user can only change the type of a component by editing its properties and changing its type. The change can be Report component to personal component (for all end-users)
Personal component to shared component (only for publisher profile and if the user is the owner of the component)

Data Source Parameters

See Data Source Properties specifications stored in DMX (Tosca/Cadenza/Functional Specifications Folder)

Check/Save/Export/Unlock/Import Data Source

Check Integrity

This feature allows the designer of the data source to obtain an automatic check for semantic or syntax errors.

The designer can apply the Check Integrity function often, at least once during each major phase in the design of its data source definition.

When the designer executes the function, a dialog box appears to allow him to check the component that he wants to be checked. When he clicks the OK button, the function will be executed.

Parse Level Checking allow the designer to choose what level of check he wants:

Quick Parsing checks only the syntax of components, that means the system verifies that the object used in the cadenza object definition exists in the universe definition or in the olap database.

Thorough parsing checks both syntax and semantic of components, that means the system verifies also if the function used exists in the Cadenza formula language and if its syntax is correct.

Of the two options, Thorough parsing provides a more extensive check and thus ensures the integrity of the components. But, Quick parsing is generally more rapid.

After the check, the designer obtains a list of errors.

So two types of unavailable objects exist:

Object that no longer exists in the source of origin (universe or olap database).

In this case, this object automatically disappears from the Data Source

Object that contains an error of syntax in its definition due to the use of an unknown function or an unknown object In this case, the object must appear unavailable in the Data Source. The Designer must be able to publish its definition in order to correct it.

The print button allows the Designer to print the result of the check.

The save as button allows the designer to save the result in a text file.

Save Data Source

When you edit a Data Source, a local copy is made on the server. The Designer of the Data Source can save locally the Data Source during its update. During this time, the Data Source stays in working or lock status. In fact the status of a Data Source stays in Working or Lock mode until the Designer exports the Data source or unlock the Data Source by choosing this option in the right click of the mouse.

There is no special screen to save a data source. This is automatically saved in the same place where it was created by the system when the designer edited it the first time.

Export a Data Source

When the Designer of the Data Source has finished the definition of the data source, he has to export it. When the designer exports the data source, the system has to unlock the data source and the universe or the olap connection used in the data source.

Unlock a Data Source

A data source is automatically to unlock when the designer exports it.

However, the Designer can decide to unlock 'manually' a data source. In this case the local copy is deleted and all the modifications are lost.

This action can be made by the designer who has lock the data source or by the general supervisor or even by all the designers who have the right to do so. This right is managed in the supervisor module.

Delete a Data Source, a Universe or an Olap Connection

If a Data Source is deleted, the system must delete the link between the data source and the universe or the olap connection. The system must also delete all the data source components and delete or invalidate also all the resources links to this data source (shared or personal variables, filter).

If a universe or an olap connection is deleted, the system must delete the data source and all its components. The entire resources link to the data source (shared or personal user defined object, filter) must also be deleted or invalidated.

Import a Data Source

The import of a data source is automatic.

Choice Data Source: Infoview must display a message if a designer wants to edit a data source already edited by another designer (DS that appear with a status 'lock'). The message can display the date since which the DS is used, the name of the designer who uses it and a text that explains that the Data Source is unavailable until the other designer unlocks it.

Creation of Cadenza components: Displays a warning message if the name using already exists.

This message is available for class, subclass, object, and filter creation.

Overview

An Axis defines the organization of a Cadenza Cube. All axes together define the Cube Structure's coordinate system. An axis can contain 0 . . . N Dimensions.

A BlockQuery is one node in the DSQuery and contains information about the required.

A Cadenza Cube consists of a Cube Structure with references to the materialized data stored in the Compound Database. A Cadenza Cube has a coordinate system of ordinals. From a coordinate you can obtain a set of tuples, which defines a point that contains either a value or another Cadenza Cube.

Cadenza Cube->Ordinal->Tuple->Point->Value or Cadenza Cube

A cell is an atomic Reporting Object that can contain a scalar value.

A client provides user interface (e.g. applet, ActiveX component, a full-client application, server-hosted client) that drives reporting process.

The Compound Database (CDB) supplies data and processing necessary to populate report. Consists of a static & index nodes. Static nodes contain data and information on how it was obtained. Index nodes reference other nodes. CDB provides interface to Navigator that allows it to access data. Also performs just-in-time local processing that maps the results from queries to expected results in report. Static nodes contain: data, DataSpace Definitions, DSE-DSD Transformations, and Query Statement. Indesx nodes contain references to tuples inside other Nodes.

The Cube Structure defines a coordinate system composed of tuples.

The Data Accessor contains a connection to a physical data source. Can be used to execute query passed to it by CDG. When query is executed it dispatches data to CDG and metadata to Outline.

A Document is a container of Report and top-level element in the Report Specification.

The DataSource Query is the Report Engine that builds and sends the DSQuery to the Query Facility. It contains the information necessary to build the query.

The Dicationary provides the interface for accessing metadata (e.g. Dimensions, Hierarchies, Levels, and Members). It stores user-defined metadata local to the Report. It accesses metadata from physical data source using Outline.

The Formula Language Expression is a Business Objects specific language that provides a way to express complex queries.

The Generic DataSource (GDS) optimizes queries and checks if required data have been previously retrieved.

The Htable is a horizontal table (Reporting Object) that contains one axis.

The Navigator uses the Cadenza Cube to provide the Report Engine with access to the data.

The OLAP-QT is a Business Objects technology that provides an abstract semantic layer between the client and the physical multidimensional database.

The Outline retrieves and stores metadata from Specific DataSource.

The Process Context stores references to Data stored in CDG and DataSpace definitions and transformations used to retrieve data.

The Query Facility defines the query using data source-neutral terms. It creates the Cube Structure that will later be used to build the Cadenza Cube.

The Query Technique (QT) is a Business Objects technology that provides an abstract semantic layer between the client and the physical relational database.

A Report acts as a contain for all Reporting Objects with the exception of the Document.

The Report Engine is responsible for processing layout, not data. The Report Engine as an intermediary between the Client and other data- and metadata-processing components.

The Report Output (also called the XML Output) is the XML stream to the Client from the Report Engine that represents the resulting report.

The Report Specification is the XML description of Report sent from Client to Report Engine. It contains graph, axis, style, query, page, and view information.

The Reporting Object is an element of a report that normally has a visual and a query component (e.g. Report, Section, Xtable, Bag).

The Reporting Context for a particular Reporting Object is defined as the path from the root (Document) to this object.

A section is a dynamic Reporting Object with infinite width and a specified height that contains one axis and one zone.

A Specific DataSource (SDS) creates data source-specific query and Data Accessor necessary to execute query.

A Table is a general class of Reporting Objects. There are actually three types of tables: Htable, Vtable, and Xtable.

The Vtable is a vertical table (Reporting Object) that contains one axis.

The Xtable is a table that can contain nested dimensions on both the column and the row axis.

The present invention encapsulates relational and OLAP data sources; thus, providing a consistent multi-dimensional view of data sources.

The RDBMS Query Technique (QT) is responsible for accessing metadata through a Universe. It provides a semantic layer for building SQL queries (although queries are executed through the RDBMS Connection Server).

The Cube component is further broken down into the following components: outline, query facility, generic DataSource, specific DataSource, compound Database, Cube structure, Cadenza cube, and navigator.

The generic DataSource (GDS) optimizes query in data source-neutral terms, checks if required data have been previously retrieved, and defines any local processing to be performed by the Compound Database.

The Specific DataSource (SDS) creates data source-specific queries. One of the two branches of the SDS is the DSQT for relational sources, which obtains metadata from Universe and creates a query using RDBMS QT and sends the query to the physical data source via RDBMS Connection Server.

The Cube structure consists of a tree of nodes, where a node's coordinate system is derived from the Reporting Objects and Axes in a Report. The Cube structure and references to the materialized data in the Compound Database will later be used to build a Cadenza Cube. In turn the Cadenza Cube will be used by Navigator to provide Report Engine with access to data. A Cadenza Cube consists of a cube structure with references to the materialized data stored in Compound Database.

Metadata access is accomplished as follows. The client sends a request for metadata to the Workspace. The Workspace uses the Report Engine to parse the layout aspect of the Report Specification. The Workspace parses the formula language expression in the Report Specification. (Metadata requests are encapsulated in formula language expressions.) If request is for user-defined metadata, the Workspace processes the request. If the request is for data from the physical data source, the Workspace requests the information from the Outline. The Outline retrieves it from the Specific DataSource. The Specific DataSource uses either OLAP DAM or RDBMS QT to obtain metadata from physical data source. Workspace caches the metadata and sends requested metadata to the Report Engine. The Report Engine uses metadata to build metadata objects. The Report Engine sends an XML representation of metadata objects to the Client via Workspace infrastructure. Then the client renders metadata to the user.

Figure 2:
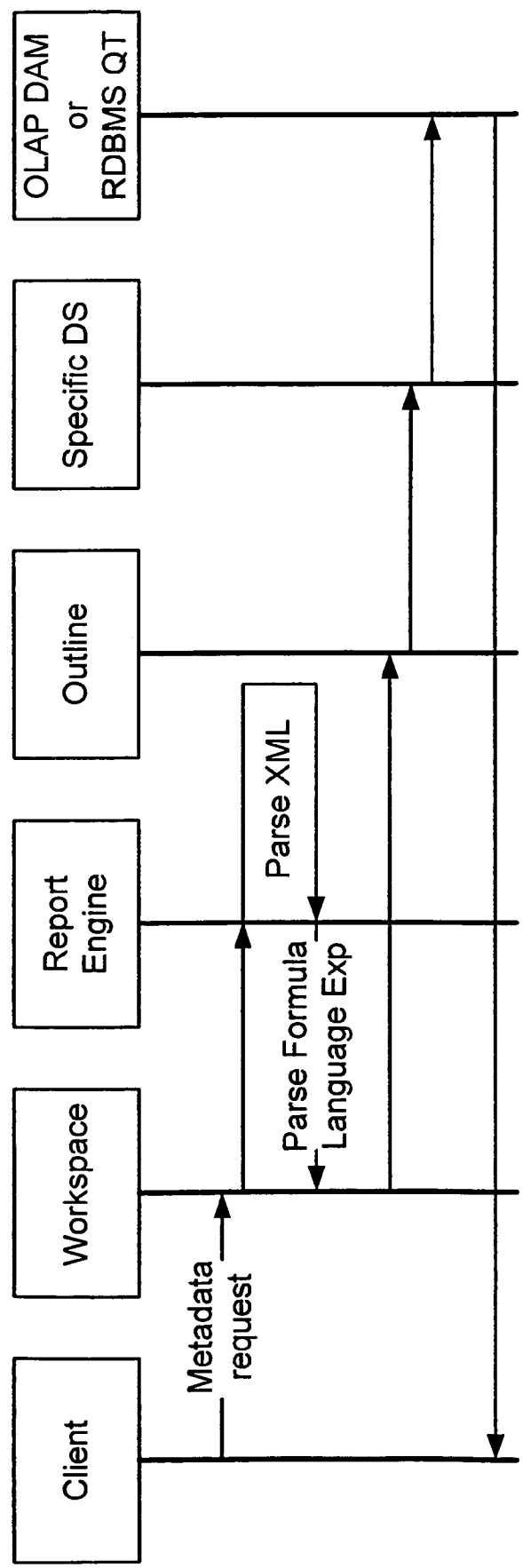
FIG. 2 illustrates metadata retrieval in accordance with the present invention.
Figure 3:
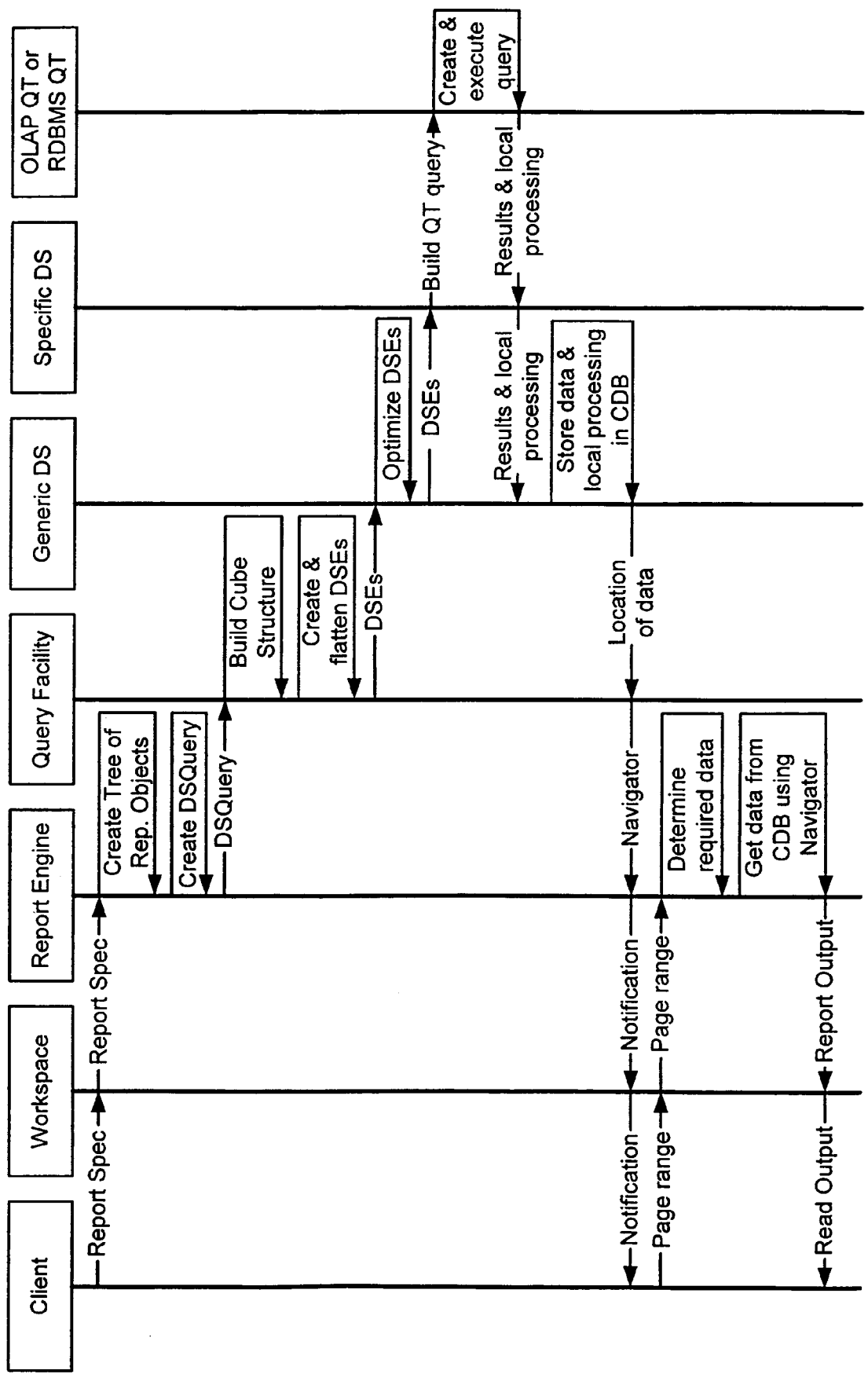
FIG. 3 illustrates report creation in accordance with the present invention.
Figure 4:
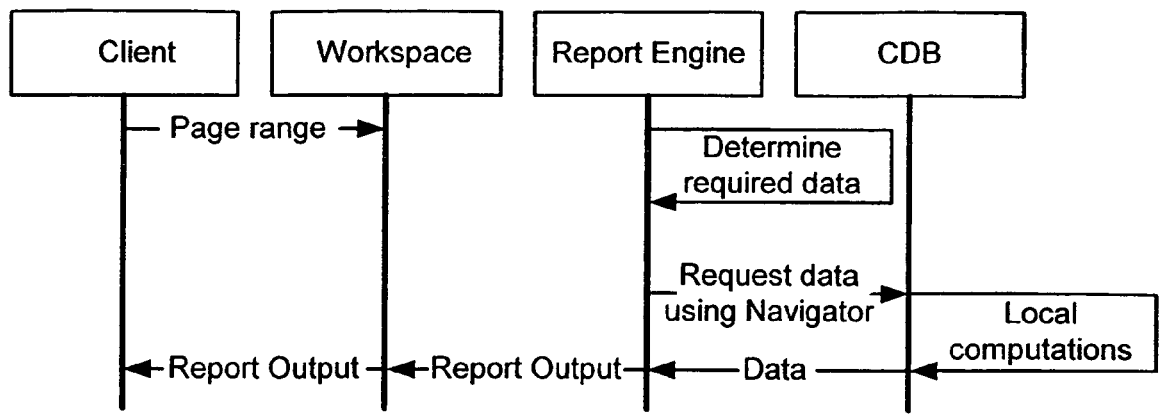
FIG. 4 illustrates report navigation in accordance with the present invention.

FIG. 2 depicts the process of retrieving metadata from the physical data source when it is not already stored in the Workspace.

For relational queries, if a DataSpace Expression returned by the SDS is different from the one requested, the GDS must ensure that there are not any redundant queries. In order to remove redundant query statements, the GDS transforms the DSEs into DSDs and removes duplicated DSDs (thus eliminating redundant queries). The GDS stores the DSDs and the DSE-DSD Transformations. For relational queries, the GDS passes the query statements and the location in CDB where materialized data should be transmitted to RDBMS Connection Server, defines required local processing based on DSEs returned from DSQT. The RDBMS Connection Server then executes the query statement and dispatches data to the Compound Database and metadata to the Workspace. For multi-dimensional queries the GDS, stores data points contained in the datasets in the CDB, defines required local processing based on DSEs returned from DSOLAP, and stores metadata contained in the datasets in the Workspace. The GDS passes location of materialized data for each requested DSE to Query Facility.

Figure 5:
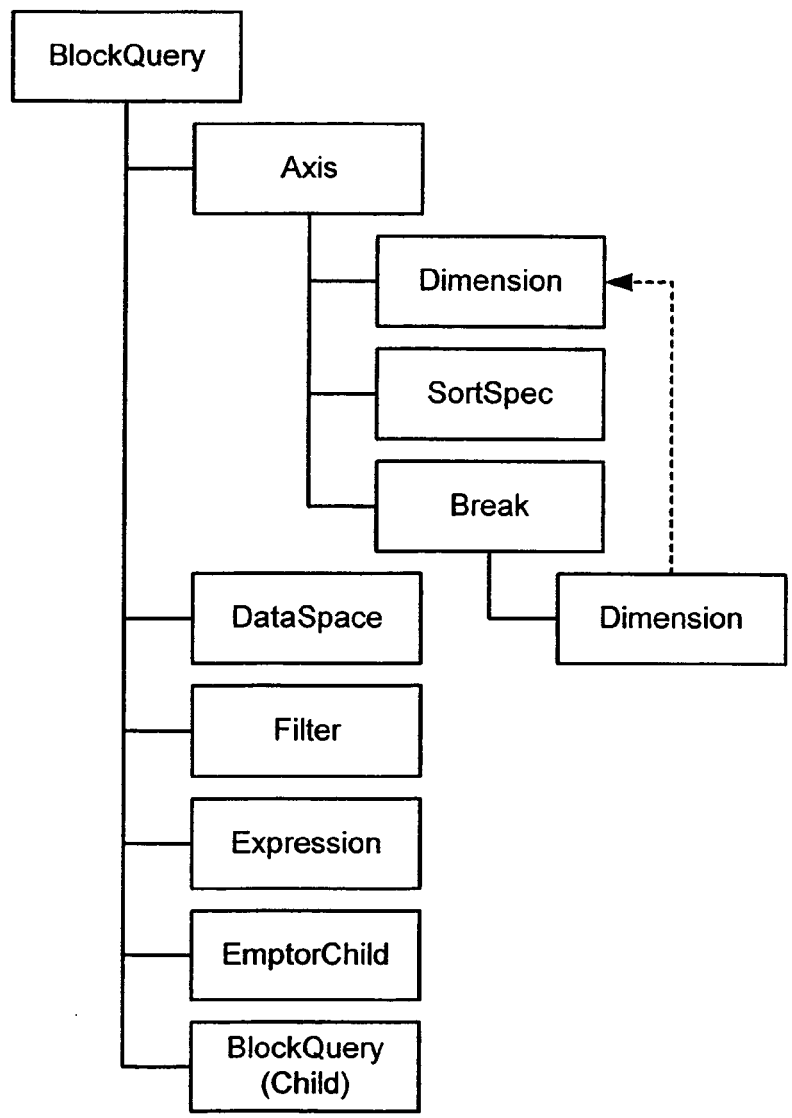
FIG. 5 illustrates a DSQuery object model in accordance with the present invention.
Figure 9:
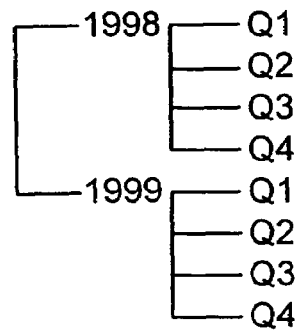
FIG. 9 illustrates the difference between the creation of a group that defines a new level and a group that defines a new hierarchy according to the present invention.
Figure 10:
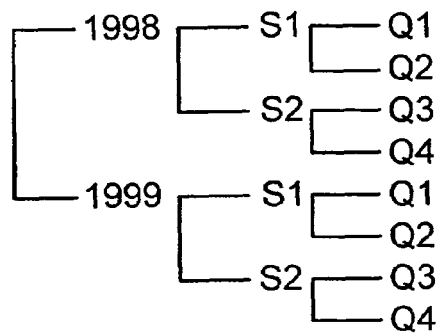
FIG. 10 illustrates the definition of a group on a level according to the present invention.
Figure 11:
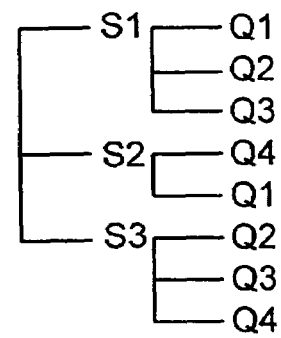
FIG. 11 illustrates the definition of a group on a level that group members from two parents according to the present invention.
Figure 12:
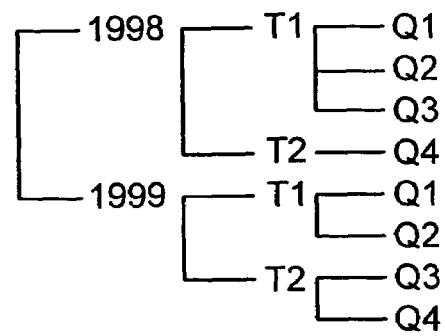
FIG. 12 illustrates the definition of a new level that becomes an alternate level the other level defined by a group according to the present invention.
Figure 13:
FIG. 13 illustrates metadata objects at the first level composed of classes and dimensions according to the present invention.
Figure 14:
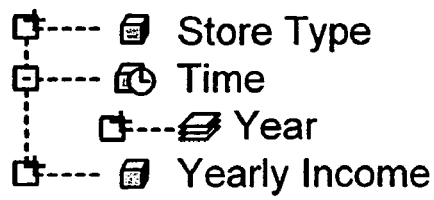
FIG. 14 illustrates the time dimension explicitly defined from the data source according to the present invention.
Figure 15:
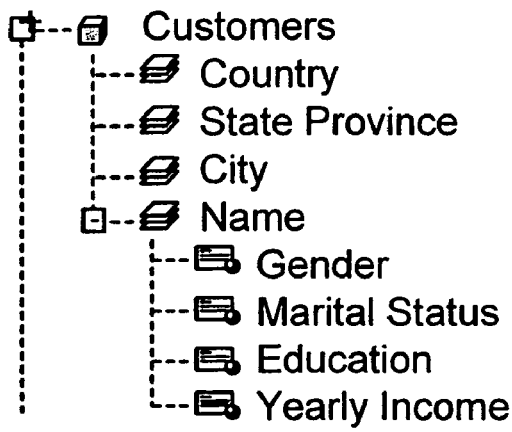
FIG. 15 illustrates a property used to associate detail to a member according to the present invention.
Figure 16:
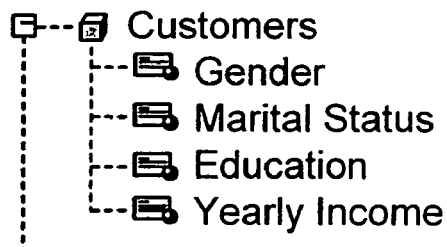
FIG. 16 illustrates a dimension with only one level according to the present invention.
Figure 17:
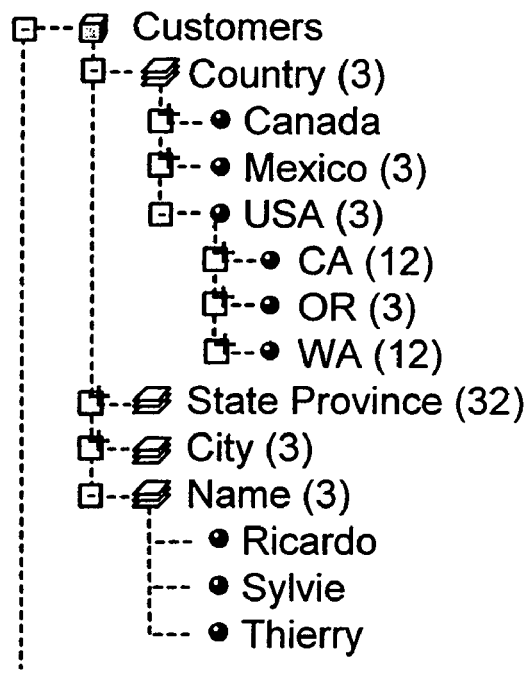
FIG. 17 illustrates members that appear when the user browses metadata object in structure mode according to the present invention.
Figure 18:
FIG. 18 illustrates a dimension having only one level that does not appear according to the present invention.
Figure 19:
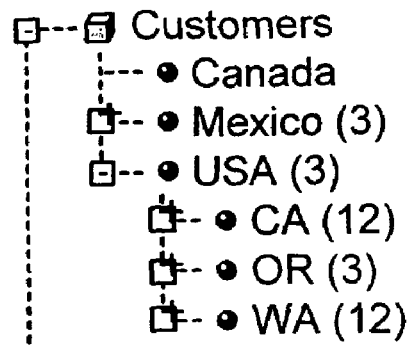
FIG. 19 illustrates the manner in which the number of hidden children and the absence of children is indicated according to the present invention.
Figure 20:
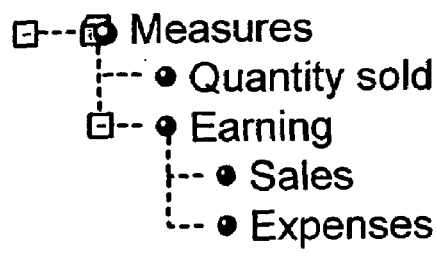
FIG. 20 illustrates that the measure dimension contains the measures according to the present invention.
Figure 21:
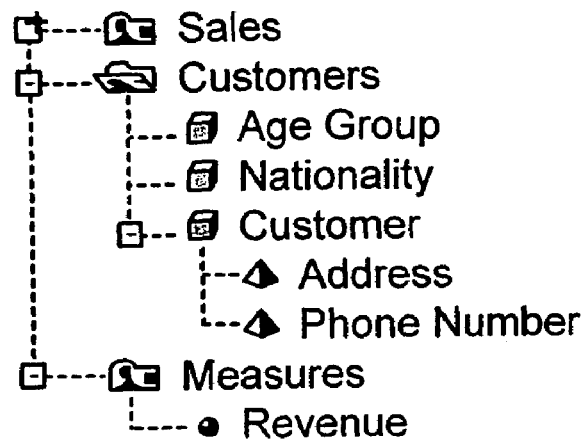
FIG. 21 illustrates detail used to add extra information to a dimension according to the present invention.
Figure 22:
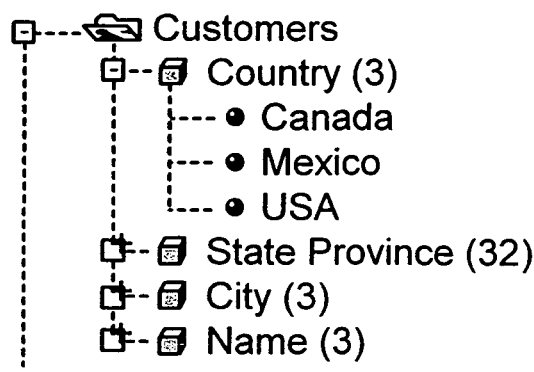
FIG. 22 illustrates that a unique name identifies a metadata object according to the present invention.
Figure 23:
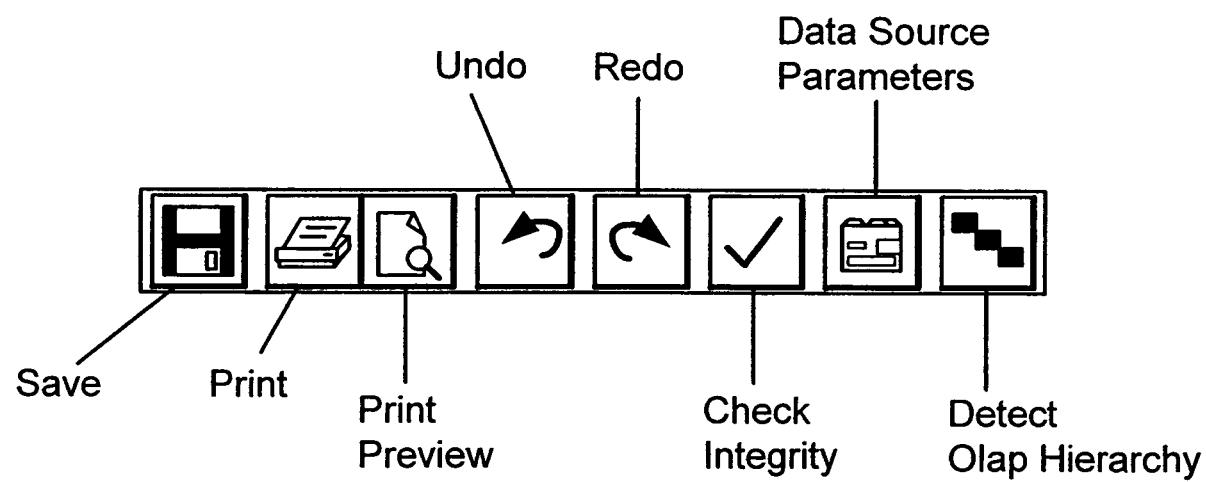
FIG. 23 illustrates the user interface for allowing the designer to detect an OLAP hierarchy according to the present invention.
Figure 24:
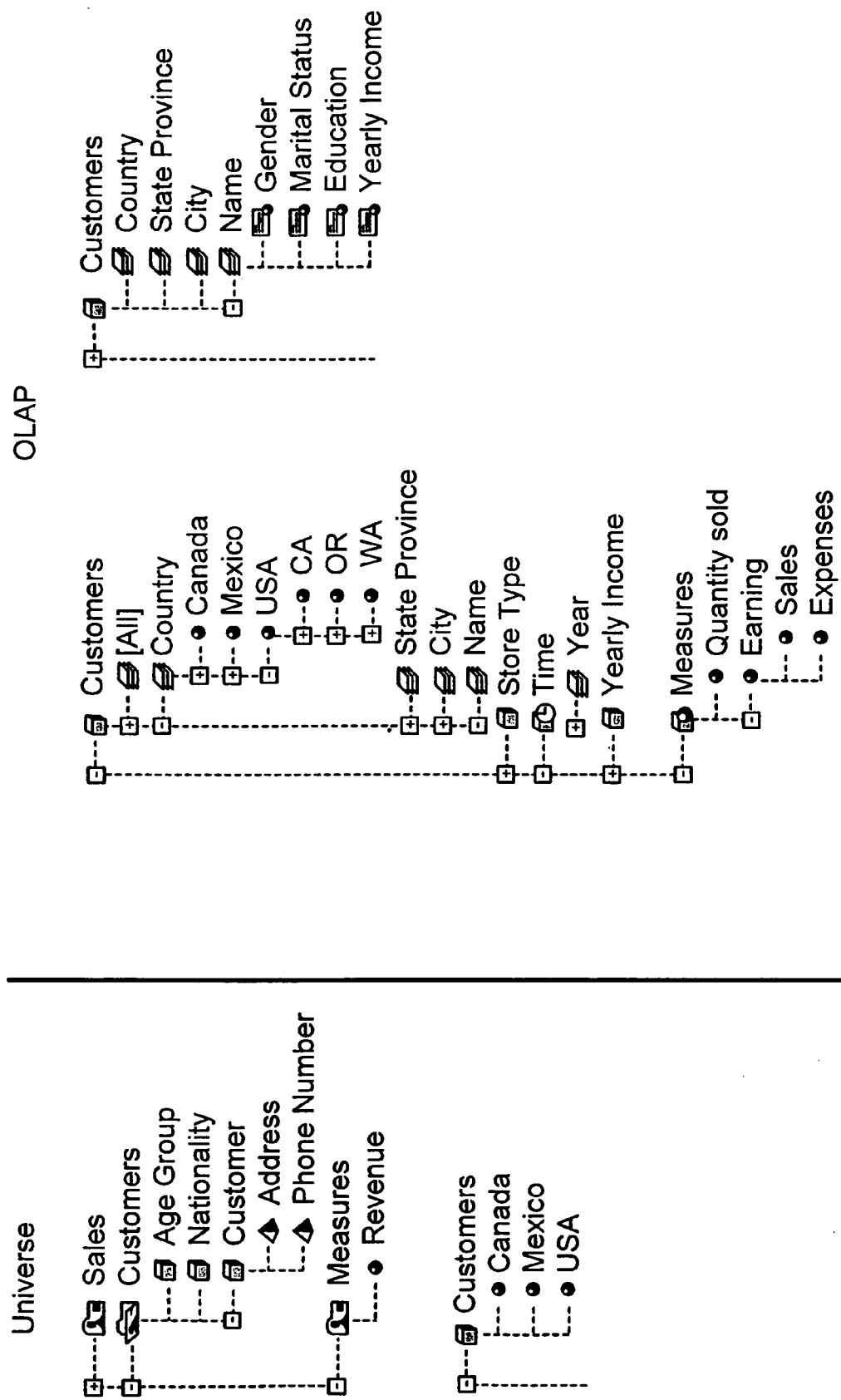
FIG. 24 illustrates differences between in functionality between an OLAP data source and an RDBMS data source according to the present invention.

The Report Engine creates a DSQuery and sends it to the Query Facility. The DSQuery consists of a tree of BlockQuery objects. FIG. 5 depicts the object model for a DSQuery.

The role of the Outline is to retrieve and store metadata. It stores the BODimensions and OLAP Dimensions as well as the following Dimensions: Dimensions of Measures (coded as m_pMeasureDimension), Dimension of Scalars (coded as m_pPropertyDimension), and Dimension of Opaque Filters (coded as m_pOpaqueDimension).

As its name implies, the Dimension of Measures (coded as m_pMeasureDimension) stores the quantitative measures found in the data source. Some data sources have special rules or storage requirements for measures (e.g. In Plato, measures do not have a hierarchy of levels). Cadenza will treat this dimension as generically as possible to allow the user to interact with this dimension as they would any other dimension.

The Dimension of Scalars (coded as m_pPropertyDimension in the CDB) is used to store properties and value expressions. The default member for the Dimension of Scalars is the 'value' member.

The Dimension of Scalars and Dimension of Measures look similar but they have distinctive differences. First, the Dimension of Scalars do not aggregate. As well, measures are usually not degenerated, whereas member properties are most often degenerated. Cadenza uses this to optimize its cube storage. Lastly, a member of the Dimension of Scalars can refer to the current member of the Dimension of Measures (e.g. Measures.CurrentMember.Caption yields the string 'Revenue'. Conversely, members in the Dimension of Scalars cannot be referred to in any expression.

Complex conditions defined in the Business Objects Universe are known as Opaque Filters. These are stored in the Dimension of Opaque Filters (coded as m_pOpaqueFilterDimension in the CDB).

A SQL expert can craft "user defined SQL filters" specific to a database's SQL compliance using Designer and then Cadenza can add this filter to a query, but Cadenza cannot check and interpret the semantics. All Cadenza knows is the opaque filters name, ID and the Universe it was created in. BO Reporter or WebI are also not able to interpret the semantics of an opaque filter.

The role of the Query Facility (QF) is to build queries in data source-neutral terms and create a structure that can be used to access the resulting data. The QF is involved in the following steps of the report creation process. The QF receives input (DSQuery) from the Report Engine, creates a Cube Structure and DataSpace Expressions. The QF passes DataSpace Expressions to Generic DataSource. The Generic DataSource passes the location of materialized data for each requested DSE to Query facility. The QF creates a Cadenza Cube by combining Cube Structure and location of materialized DataSpaces in Compound Database. The QF creates the Navigator and passes it to the Report Engine.

The Query Facility builds Cube Structure based on the DSQuery received from the Report Engine. The Cube Structure is then later used to builds the Cadenza Cube, which in turn will be used by Navigator to provide Report Engine with access to data. The following steps are performed during the creation of the Cube Structure: starting at the root of the BlockQuery, traverse the tree: extracting axis information (when it exists).

The QF creates report's Cadenza Cube by combining the Cube Structure derived from the DSQuery and references to materialized DataSpaces in the Compound Database.

The Cadenza Cube consists of a Cube Structure with references to the materialized data stored in Compound Database. A Cadenza Cube has a coordinate system of ordinals. From a coordinate you can obtain a set of tuples, which defines a point that contains either a value or another Cadenza Cube.

Cadenza Cube->Ordinal->Tuple->Point->Value or Cadenza Cube

With respect to the Outline Browser, an RDBMS allows objects with one level for universes, such as Class, Dimension, Member, Measure, and Detail, with the objects sorted in lexicographical ascending order. In contrast, an OLAP allows additional objects to show real hierarchies with several levels, therefore the object hierarchies include Dimension, Level, Member, Measure, and Property, with the objects sorted in natural hierarchical order.

With respect to the Document Zone, an RDBMS implicates sorting on results that are lexicographical ascending; sorting cannot be performed hierarchically. When a user makes a change that requires retrieval of new data from the database in the report when the document zone is in values mode, Cadenza will automatically change the document zone mode to structure mode where the user must click the "Refresh" button to display the results in the document zone. Auto refresh is disabled; thus allow automatic data retrieval on document interaction is set to "off." Local calculations may be performed when data are available.

In contrast, an OLAP implicates sorting on results that are sorted in natural hierarchical order with changeable indentation and sorting can be performed hierarchically. Auto refresh is enabled; thus allow automatic data retrieval on document interaction is set to "on." Server calculation may always be performed.

With respect to the Filter Wizard, an RDBMS indicates that when choosing values to create a filter, the user may only choose available values or create constants. In contrast, in an OLAP, when choosing values to create a filter, the user may not only choose values but may also choose to add the children, siblings, parent, descendants, ancestors, lowest members, family formula, or time formula. The user may also create a constant or a new value using a formula or a default member.

With respect to Data Analysis, an RDBMS permits Drill and Replace, whereas an OLAP permits Drill and Replace and Drill and Expand.

With respect to the Data Provider, an RDBMS permits scope of analysis via the number of levels down. In contrast, an OLAP permits no scope of analysis via the number of levels down.

While the present invention has been described with reference to preferred and alternative embodiments, those embodiments are offered by way of example, not by way of limitation. Various additions, deletions, and modifications can be applied to the present invention without departing from the spirit and scope of the present invention. Accordingly, all such additions, deletions, and modifications are deemed to lie within the scope of the present invention as delineated in the appended claims.

What is claimed is:

1. A method of translating a universe data source into a multi-dimensional data model, the method comprising:
    accessing a universe data source operating as a semantic layer between a user and a database, wherein the universe data source includes classes and objects, where the objects map to data in the database;
    mapping each dimension from the universe into a corresponding dimension in the multi-dimensional model;
    creating a single level for each dimension in the multi-dimensional model; and
    assigning a default member to each dimension in the multi-dimensional model.

2. A method as in claim 1, further comprising:
    creating a member in the multi-dimensional model corresponding to each member in the universe.

3. A method as in claim 1, further comprising:
    when the universe contains one or more measures, creating a measure dimension in the multi-dimensional model.

4. A method as in claim 3, further comprising:
    for each measure in the universe, creating a corresponding measure within the measure dimension of the multi-dimensional model.

5. A method as in claim 3 wherein a name of the measure dimension within the multi-dimensional model is localizable.

* * * * *